United States Patent
Hayashi

(10) Patent No.: US 11,079,979 B2
(45) Date of Patent: Aug. 3, 2021

(54) INFORMATION PROCESSING APPARATUS, CONTROL METHOD THEREFOR, AND STORAGE MEDIUM

(71) Applicant: CANON KABUSHIKI KAISHA, Tokyo (JP)

(72) Inventor: Kimio Hayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/809,341

(22) Filed: Mar. 4, 2020

(65) Prior Publication Data

US 2020/0293241 A1 Sep. 17, 2020

(30) Foreign Application Priority Data

Mar. 15, 2019 (JP) .............................. JP2019-048236

(51) Int. Cl.
*G06F 3/12* (2006.01)

(52) U.S. Cl.
CPC .......... *G06F 3/1208* (2013.01); *G06F 3/1204* (2013.01); *G06F 3/1257* (2013.01); *G06F 3/1286* (2013.01); *G06F 3/1287* (2013.01)

(58) Field of Classification Search
CPC .... G06F 3/1208; G06F 3/1204; G06F 3/1257; G06F 3/1286; G06F 3/1287
USPC ....................................................... 358/1.15
See application file for complete search history.

(56) References Cited

U.S. PATENT DOCUMENTS

| 7,379,198 B1* | 5/2008 | Ishida | G06K 15/005 358/1.13 |
| 9,940,074 B1* | 4/2018 | Soriano | G06F 3/1272 |
| 2008/0024820 A1* | 1/2008 | Ohtomo | G06F 3/1284 358/1.15 |
| 2008/0137137 A1* | 6/2008 | Yamada | H04N 1/33315 358/1.15 |
| 2008/0278744 A1* | 11/2008 | Marchesotti | G06F 3/1256 358/1.15 |
| 2008/0304102 A1* | 12/2008 | Saito | G06F 3/1264 358/1.15 |
| 2010/0196023 A1* | 8/2010 | Shiozawa | G03G 15/5029 399/39 |
| 2011/0197123 A1* | 8/2011 | Caine | G06F 3/1454 715/234 |
| 2016/0188268 A1 | 6/2016 | Yamagishi et al. | |
| 2016/0203392 A1 | 7/2016 | Metcalfe et al. | |

FOREIGN PATENT DOCUMENTS

| EP | 0814601 A2 | 12/1997 |
| JP | 2017-220201 A | 12/2017 |
| WO | 2020/138130 A1 | 7/2020 |

* cited by examiner

Primary Examiner — Allen H Nguyen
(74) Attorney, Agent, or Firm — Canon U.S.A., Inc. IP Division

(57) ABSTRACT

An information processing apparatus receives designation of a level of a print quality requirement concerning a print product, identifies a quality level for each of a plurality of print parameters corresponding to the received level of the print quality requirement concerning the print product based on a table in which the level of a print quality requirement is associated with a quality level for each of the plurality of print parameters, and outputs requirement data representing the identified quality level for each of the print parameters.

9 Claims, 25 Drawing Sheets

| Grade | | Score | | | |
|---|---|---|---|---|---|
| | | Color | Barcode | Defect | Registration |
| Excellent | Display Label | Excellent | Passed | Excellent | Excellent |
| | Rank | 3 | 2 | 3 | 3 |
| | Value Range | ΔE = within 1 | Successful | 0 case | 0.001 mm or less |
| | Desired Rank | Yes | Yes | No 1303 | No 1304 |
| | Minimum Acceptable Rank | No | No | No | No |
| Average | Display Label | Average | Passed | Average | Average |
| | Rank 1305 | 2 | 2 | 2 | 2 |
| | Value Range | ΔE = within 2 to 3 | Successful | 1 to 3 cases | 0.002 mm or less |
| | Desired Rank | No | No | Yes | Yes |
| | Minimum Acceptable Rank | Yes | Yes | No | No |
| Trial | Display Label | Poor | Failed | Poor | Poor |
| | Rank | 1 | 1 | 1 | 1 |
| | Value Range | ΔE = within 4 to 8 | Failed | 4 or more cases | 0.003 mm or less |
| | Desired Rank | No | No | No | No |
| | Minimum Acceptable Rank | No | No | Yes | Yes |

FIG.7

| Grade | | Score | | | |
|---|---|---|---|---|---|
| | | Color | Barcode | Defect | Registration |
| Excellent | Display Label | Excellent | Passed | Excellent | Excellent |
| | Rank | 3 | 2 | 3 | 3 |
| | Value Range | ΔE = within 1 | Successful | 0 case | 0.001 mm or less |
| Average | Display Label | Average | Passed | Average | Average |
| | Rank | 2 | 2 | 2 | 2 |
| | Value Range | ΔE = within 2 to 3 | Successful | 1 to 3 cases | 0.002 mm or less |
| Trial | Display Label | Poor | Failed | Poor | Poor |
| | Rank | 1 | 1 | 1 | 1 |
| | Value Range | ΔE = within 4 to 8 | Failed | 4 or more cases | 0.003 mm or less |

700

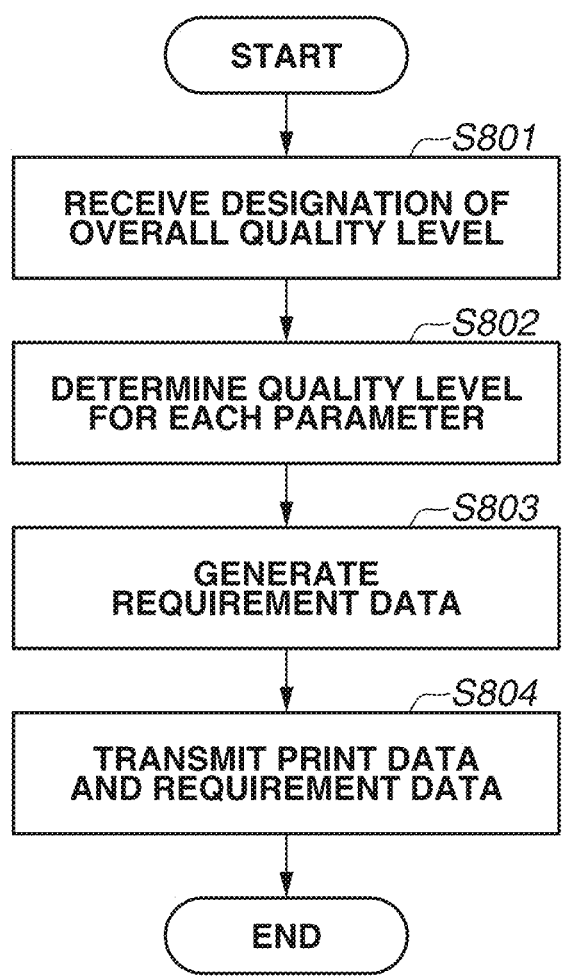

```
<PRX>
<PRXInfo>(...)</PRXInfo>
<SamplingPositionImageData>
    <PositionLocationImage Id="123456" ImageLink="xxxxxxxxxxxx"/>
</SamplingPositionImageData>
<QualitySpecification>
    (...)
    <QualityGoals>
        <Registration>
            <ScoringInfo>
                <BasisOfCalculation>
                    <WeightedPercentage/>
                    <Formula>
                        <FormulaName>CONFIRMATION METHOD FOR FRONT AND BACK REGISTRATION ACCURACY</FormulaName>
                        <MathOrMethod>VISUAL CONFIRMATION OF FRONT AND BACK MISREGISTRATION</MathOrMethod>
                    </Formula>
                </BasisOfCalculation>
                <MinimumAcceptableRank>2</MinimumAcceptableRank>
            </ScoringInfo>
            <RegistrationScoringScale>
                <UoM>mm</UoM>
                <ParameterScore DisplayLabel="Excellent" Rank="3">
                    <ValueRange>
                        <Operator>LTE</Operator>
                        <CalculatedValue>0.001</CalculatedValue>
                    </ValueRange>
                </ParameterScore>
                <ParameterScore DisplayLabel="Average" Rank="2">
                    <ValueRange>
                        <Operator>LTE</Operator>
                        <CalculatedValue>0.002</CalculatedValue>
                    </ValueRange>
                </ParameterScore>
            </RegistrationScoringScale>
            <RegistrationParameter>
                <ParameterName>Sample</ParameterName>
                <SamplingPosition>
                    <SamplingPositionImageIdLink>123456</SamplingPositionImageIdLink>
                    <SamplingPositionMatrix>
                        <UoM>mm</UoM>
                        <Origin>BL</Origin>
                        <PositionDefinition PositionLabel="Sample">
                            <XPosition>11</XPosition>
                            <YPosition>5</YPosition>
                        </PositionDefinition>
                    </SamplingPositionMatrix>
                <SamplingPosition>
                <RegistrationParameter>
                (...)
            </Registration>
        </QualityGoals>
    </QualitySpecification>
</PRX>
```

*901* — `<PRX>` section start
*902* — `<Formula>`
*903* — `<ParameterScore DisplayLabel="Excellent" Rank="3">`
*904* — `<ParameterScore DisplayLabel="Average" Rank="2">`
*905* — `<SamplingPosition>`

FIG.11

```
1100   <PRX>
       <PRXInfo>(...)</PRXInfo>
       <SamplingPositionImageData>
           <PositionLocationImage Id="123456" ImageLink="xxxxxxxxxxxx"/>
       </SamplingPositionImageData>
       <QualitySpecification>
           (...)
           <QualityGoals>
               <Registration>
                   <ScoringInfo>
                       <BasisOfCalculation>
                           <WeightedPercentage/>
                           <Formula>
                               <FormulaName>CONFIRMATION METHOD FOR FRONT AND BACK REGISTRATION ACCURACY</FormulaName>
                               <MathOrMethod>VISUAL CONFIRMATION OF FRONT AND BACK MISREGISTRATION</MathOrMethod>
                           </Formula>
                       </BasisOfCalculation>
                       <MinimumAcceptableRank>2</MinimumAcceptableRank>
                   </ScoringInfo>
                   <RegistrationScoringScale>
                       <UoM>mm</UoM>
                       <ParameterScore DisplayLabel="Excellent" Rank="3">
                           <ValueRange>
                               <Operator>LTE</Operator>
                               <CalculatedValue>0.001</CalculatedValue>
                           </ValueRange>
                       </ParameterScore>
                       <ParameterScore DisplayLabel="Average" Rank="2">
                           <ValueRange>
                               <Operator>LTE</Operator>
                               <CalculatedValue>0.002</CalculatedValue>
                           </ValueRange>
                       </ParameterScore>
                   </RegistrationScoringScale>
                   <RegistrationParameter>
                       <ParameterName>Sample</ParameterName>
1101              <SamplingPosition>
                           <SamplingPositionImageIdLink>123456</SamplingPositionImageIdLink>
                           <SamplingPositionMatrix>
                               <UoM>mm</UoM>
                               <Origin>BL</Origin>
                               <PositionDefinition PositionLabel="Sample">
                                   <XPosition>11</XPosition>
                                   <YPosition>5</YPosition>
                               </PositionDefinition>
                           </SamplinePositionMatrix>
                       </SamplingPosition>
                   </RegistrationParameter>
                   (...)
               </Registration>
           </QualityGoals>
       </QualitySpecification>
       </PRX>
```

FIG.13

| Grade | | Score | | | |
|---|---|---|---|---|---|
| | | Color | Barcode | Defect | Registration |
| Excellent | Display Label | Excellent | Passed | Excellent | Excellent |
| | Rank | 3 | 2 | 3 | 3 |
| | Value Range | ΔE = within 1 | Successful | 0 case | 0.001 mm or less |
| | Desired Rank | Yes | Yes | No | No |
| | Minimum Acceptable Rank | No | No | No | No |
| Average | Display Label | Average | Passed | Average | Average |
| | Rank | 2 | 2 | 2 | 2 |
| | Value Range | ΔE = within 2 to 3 | Successful | 1 to 3 cases | 0.002 mm or less |
| | Desired Rank | No | No | Yes | Yes |
| | Minimum Acceptable Rank | Yes | Yes | No | No |
| Trial | Display Label | Poor | Failed | Poor | Poor |
| | Rank | 1 | 1 | 1 | 1 |
| | Value Range | ΔE = within 4 to 8 | Failed | 4 or more cases | 0.003 mm or less |
| | Desired Rank | No | No | No | No |
| | Minimum Acceptable Rank | No | No | Yes | Yes |

FIG.14

```
<PRX>
<PRXInfo> (...) </PRXInfo>
<SamplingPositionImageData>
    <PositionLocationImage Id="123456" ImageLink="xxxxxxxxxxxx"/>
</SamplingPositionImageData>
<QualitySpecification>
    (...)
    <QualityGoals>
        <Registration>
            <ScoringInfo>
                <BasisOfCalculation>
                    <WeightedPercentage/>
                    <Formula>
                        <FormulaName>CONFIRMATION METHOD FOR FRONT AND BACK REGISTRATION ACCURACY</FormulaName>
                        <MathOrMethod>VISUAL CONFIRMATION OF FRONT AND BACK MISREGISTRATION</MathOrMethod>
                    </Formula>
                </BasisOfCalculation>
1400 ──     <DesiredRank>2</DesiredRank>
1401 ──     <MinimumAcceptableRank>1</MinimumAcceptableRank>
            </ScoringInfo>
            <RegistrationScoringScale>
                <UoM>mm</UoM>
1402 ──     <ParameterScore DisplayLabel="Average" Rank="2">
                <ValueRange>
                    <Operator>LTE</Operator>
                    <CalculatedValue>0.002</CalculatedValue>
                </ValueRange>
            </ParameterScore>
1403 ──     <ParameterScore DisplayLabel="Poor" Rank="1">
                <ValueRange>
                    <Operator>LTE</Operator>
                    <CalculatedValue>0.003</CalculatedValue>
                </ValueRange>
            </ParameterScore>
            </RegistrationScoringScale>
            <RegistrationParameter>
                <ParameterName>Sample</ParameterName>
                <SamplingPosition>
                    <SamplingPositionImageIdLink>123456</SamplingPositionImageIdLink>
                    <SamplingPositionMatrix>
                        <UoM>mm</UoM>
                        <Origin>BL</Origin>
                        <PositionDefinition PositionLabel="Sample">
                            <XPosition>11</XPosition>
                            <YPosition>5</YPosition>
                        </PositionDefinition>
                    </SamplinePositionMatrix>
                </SamplingPosition>
            </RegistrationParameter>
            (...)
        </Registration>
    </QualityGoals>
</QualitySpecification>
</PRX>
```

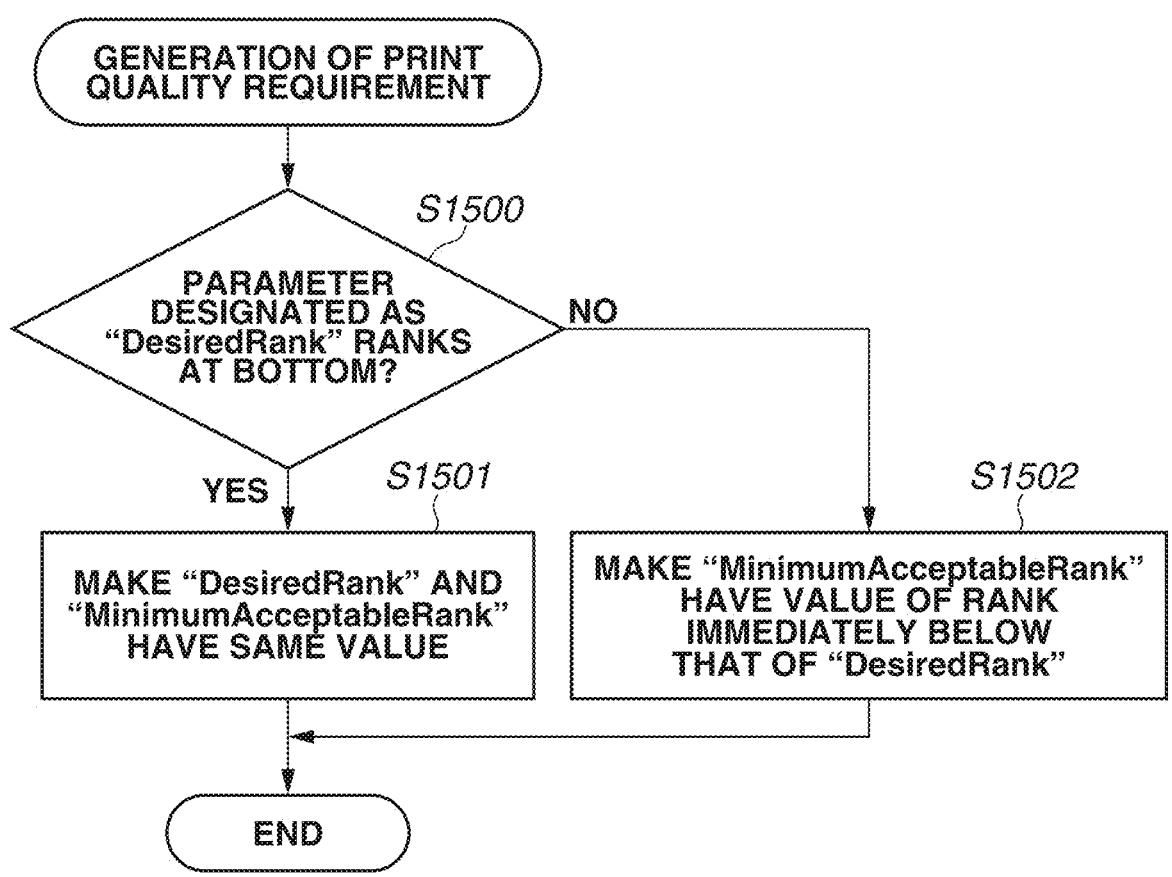

FIG.16

| Grade | | Score | | | | |
|---|---|---|---|---|---|---|
| | | | Color | Barcode | Defect | Registration |
| Excellent | Display Label | | Excellent | Passed | Excellent | Excellent |
| | Rank | | 3 | 2 | 3 | 3 |
| | Value Range | | ΔE = within 1 | Successful | 0 case | 0.001 mm or less |
| | Desired Rank | | Yes | Yes | No | No *1601* |
| | Minimum Acceptable Rank | | No | No | No | No |
| Average | Display Label | | Average | Passed | Average | Average |
| | Rank | | 2 | 2 | 2 | 2 |
| | Value Range | | ΔE = within 2 to 3 | Successful | 1 to 3 cases | 0.002 mm or less |
| | Desired Rank | | No | No | Yes | Yes |
| | Minimum Acceptable Rank | | Yes | Yes | No | No |
| Trial | Display Label | | Poor | Failed | Poor | Poor |
| | Rank | | 1 | 1 | 1 | 1 |
| | Value Range | | ΔE = within 4 to 8 | Failed | 4 or more cases | 0.003 mm or less |
| | Desired Rank | | No | No | Yes | No |
| | Minimum Acceptable Rank | | No | No | No | Yes |

*1600* *1602*

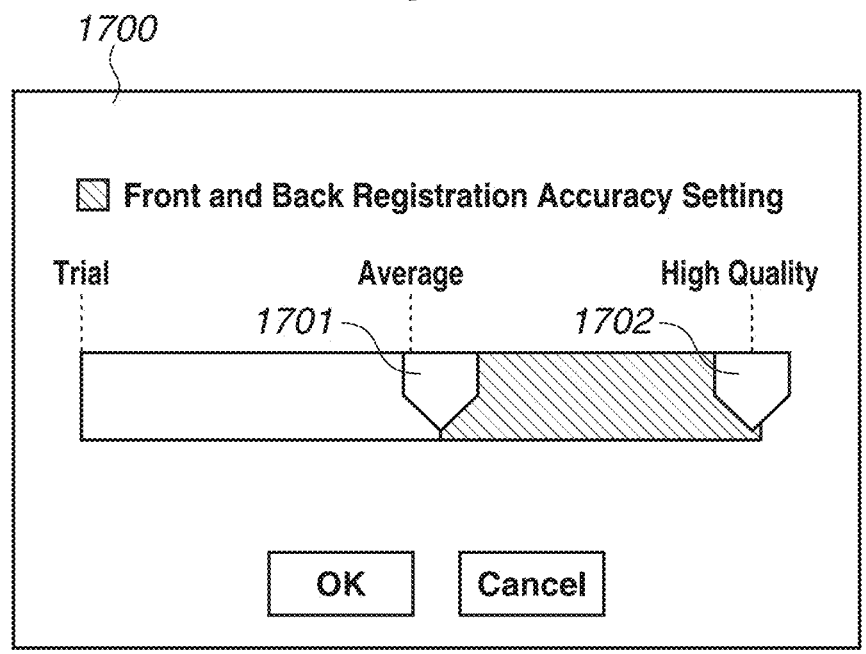

FIG.18

```xml
<PRX>
<PRXInfo> (...) </PRXInfo>
<SamplingPositionImageData>
    <PositionLocationImage Id="123456" ImageLink="xxxxxxxxxxxx"/>
</SamplingPositionImageData>
<QualitySpecification>
    (...)
    <QualityGoals>
        <Registration>
            <ScoringInfo>
                <BasisOfCalculation>
                    <WeightedPercentage/>
                    <Formula>
                        <FormulaName>CONFIRMATION METHOD FOR FRONT AND BACK REGISTRATION ACCURACY</FormulaName>
                        <MathOrMethod>VISUAL CONFIRMATION OF FRONT AND BACK MISREGISTRATION</MathOrMethod>
                    </Formula>
                </BasisOfCalculation>
1800 —  <DesiredRank>2</DesiredRank>
1801 —  <MinimumAcceptableRank>1</MinimumAcceptableRank>
            </ScoringInfo>
            <RegistrationScoringScale>
                <UoM>mm</UoM>
1802 —      <ParameterScore DisplayLabel="A" Rank="2">
                <ValueRange>
                    <Operator>LTE</Operator>
                    <CalculatedValue>0.002</CalculatedValue>
                </ValueRange>
                <ParameterScore>
1803 —      <ParameterScore DisplayLabel="B" Rank="1">
                <ValueRange>
                    <Operator>LTE</Operator>
                    <CalculatedValue>0.003</CalculatedValue>
                </ValueRange>
                </ParameterScore>
            </RegistrationScoringScale>
            <RegistrationParameter>
                <ParameterName>Sample</ParameterName>
                <SamplingPosition>
                    <SamplingPositionImageIdLink>123456</SamplingPositionImageIdLink>
                    <SamplingPositionMatrix>
                        <UoM>mm</UoM>
                        <Origin>BL</Origin>
                        <PositionDefinition PositionLabel="Sample">
                            <XPosition>11</XPosition>
                            <YPosition>5</YPosition>
                        </PositionDefinition>
                    </SamplinePositionMatrix>
                </SamplingPosition>
            </RegistrationParameter>
            (...)
        </Registration>
    </QualityGoals>
</QualitySpecification>
</PRX>
```

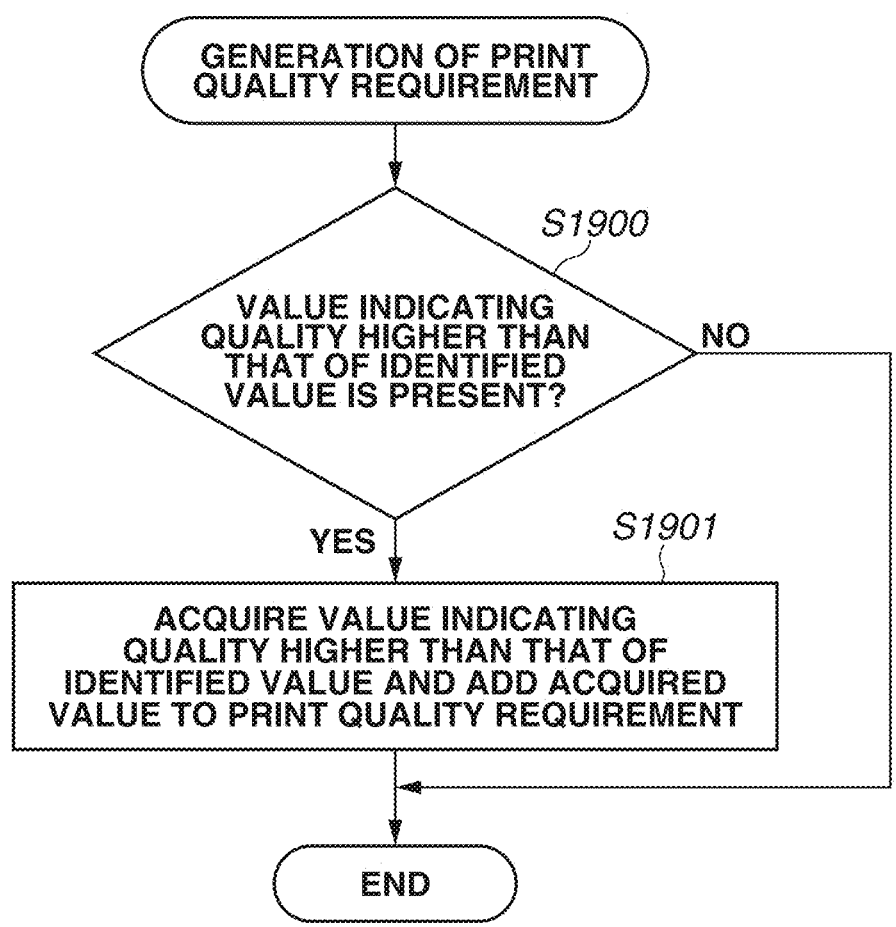

FIG.23

```xml
2300 ─ <PQX>
2301 ─   <PrinterInfo>
             <ParentCompany>ABC Inc.</ParentCompany>
             <Printer>Queens Printer</Printer>
             <Location>Queens, NY</Location>
         < PrinterInfo>
2302 ─   <PressRunInfo>
             <DatePrinted>2016-08-30</DatePrinted>
             <PrinterLotId>701-123-3331</PrinterLotId>
             <RunLength TotalRolls="8" TotalMeterage="16000" UoM="ft"/>
             <PrintMethod>flexography</PrintMethod>
             <PrintSide>surface</PrintSide>
             <PressLine>3</PressLine>
             <PressOperator>John Schmidt</PressOperator>
             <PrinterJobDescription>WoWs 12 oz bags</PrinterJobDescription>
             <PrinterJobNumber>Bag012</PrinterJobNumber>
         </PressRunInfo>
2303 ─   <SampleCollection>
             <Sample>
                 <SampleDescription>
                     <RunPosition Roll="4" Meterage="1234" UoM="ft"/>
                 </SampleDescription>
2304 ─           <ColorReport ReportType="toneCalculation">
                     <MeasurementSet>
                         <CustomerItemIdLink>SKU1234</CustomerItemIdLink>
                         <PositionOnSample PositionLabel="image position 1">1</PositionOnSample>
                         <Measurement Id="M005">
                             <MeasurementName>MySubstrate</MeasurementName>
                             <PatchType>substrate</PatchType>
                             <CxFSampleObjectIdLink>CxF1</CxFSampleObjectIdLink>
                         </Measurement>
                     </MeasurementSet>
                 </ColorReport>
2305 ─           <RegistrationReport>
                     <RegistrationSet>
                         <CustomerItemIdLink>SKU1234</CustomerItemIdLink>
                         <PositionOnSample PositionLabel="left">1</PositionOnSample>
                         <ChannelReport>
                         <MeasuredChannel>
                             <ReporterIdLink>OID001</ReporterIdLink>
                             <ReferenceInkIdLink>Cyan01</ReferenceInkIdLink>
                             <InkIdLink>Magenta01</InkIdLink>
                             <UoM>mm</UoM>
                             <XPositionOffset>0</XPositionOffset>
                             <YPositionOffset>0</YPositionOffset>
                         </MeasuredChannel>
                         </ChannelReport>
                     </RegistrationSet>
                 </RegistrationReport>
2306 ─           <BarcodeReport>
                     <VerificationSet>
                         <CustomerItemIdLink>SKU1234</CustomerItemIdLink>
                         <PositionOnSample PositionLabel="BackCenterRight">1</PositionOnSample>
                         </Barcode2DEntry>
                         <!--...-->
                         </Barcode2DEntry>
                     </VerificationSet>
                 </BarcodeReport>
             </Sample>
         </SampleCollection>
2307 ─   <CxFSampleData>
             <cc:CxF>
                 <!--...-->
             </cc:CxF>
         </CxFSampleData>
     </PQX>
``` though, although there are many parameters for evaluating a print product, it is significantly burdensome for a customer (user) to designate an acceptable range concerning print quality for each of such parameters.

INFORMATION PROCESSING APPARATUS, CONTROL METHOD THEREFOR, AND STORAGE MEDIUM

BACKGROUND OF THE INVENTION

Field of the Invention

The present invention relates to generation of requirement data representing a print quality requirement for realizing print quality intended by a customer.

Description of the Related Art

In commercial printing, when a customer requests a print company to produce a print product, the customer needs to convey the intended print quality to the print company, using a color chart or checking a sample of the print product. Examples of requirements about print quality include an image quality level, barcode reading accuracy, and front and back accuracy, and there are many parameters for evaluating a print product. Meanwhile, as discussed in Japanese Patent Application Laid-Open No. 2017-220201, digital printing that provides products in a small lot in a short delivery period is widespread.

A customer needs technical knowledge for precisely conveying a requirement to a print company, but a customer without such technical knowledge has no way of easily conveying a requirement to a print company. In particular, in the case of the digital printing, it is difficult to achieve an agreement about print quality based on a color chart and a sample, because of a small lot and a short delivery period, unlike conventional printing. Moreover, although there are many parameters for evaluating a print product, it is significantly burdensome for a customer (user) to designate an acceptable range concerning print quality for each of such parameters.

SUMMARY OF THE INVENTION

The present invention is directed to a reduction in burden placed on a user to generate requirement data representing a quality level for each of print parameters.

According to an aspect of the present invention, an information processing apparatus includes a reception unit configured to receive designation of a level of a print quality requirement concerning a print product, a storage unit configured to store a table in which the level of a print quality requirement is associated with a quality level for each of a plurality of print parameters, an identification unit configured to identify the quality level for each of the plurality of print parameters corresponding to the received level of the print quality requirement concerning the print product, based on the table, and an output unit configured to output requirement data representing the identified quality level for each of the print parameters.

Further features of the present invention will become apparent from the following description of embodiments with reference to the attached drawings.

BRIEF DESCRIPTION OF THE DRAWINGS

FIG. 7 illustrates an example of a conversion table according to the first embodiment.

FIG. 8 is a flowchart according to the first embodiment.

FIG. 9 illustrates an example of a print quality requirement according to the first embodiment.

FIG. 11 illustrates an example of a print quality requirement according to the third modification of the first embodiment.

FIG. 13 illustrates an example of a conversion table according to the first modification of the first embodiment.

FIG. 14 illustrates an example of a print quality requirement according to the first modification of the first embodiment.

FIG. 15 is a flowchart according to the first modification of the first embodiment.

FIG. 16 illustrates an example of a conversion table according to the first modification of the first embodiment.

FIG. 17 illustrates an example of an input screen according to a second modification of the first embodiment.

FIG. 18 illustrates an example of a print quality requirement according to the second modification of the first embodiment.

FIG. 19 illustrates a flowchart according to the first embodiment.

FIG. 23 illustrates an example of a report from the measurement device according to the first embodiment.

DESCRIPTION OF THE EMBODIMENTS

Embodiments of the present invention will be described below with reference to the drawings.

In the embodiments, Print Requirements eXchange (PRX) developed by the International Organization for Standardization (ISO) is used as a data format. Besides PRX, Customer Quality Control (CusQC) and Management Information System Quality Control (MisQC) Interoperability Conformance Specifications developed by the Cooperation for Integration of Processes in Prepress, Press, and Postpress (CIP4), which is a standards group for commercial printing, may be used.

Configuration Example of Information Processing System

Figure 1:
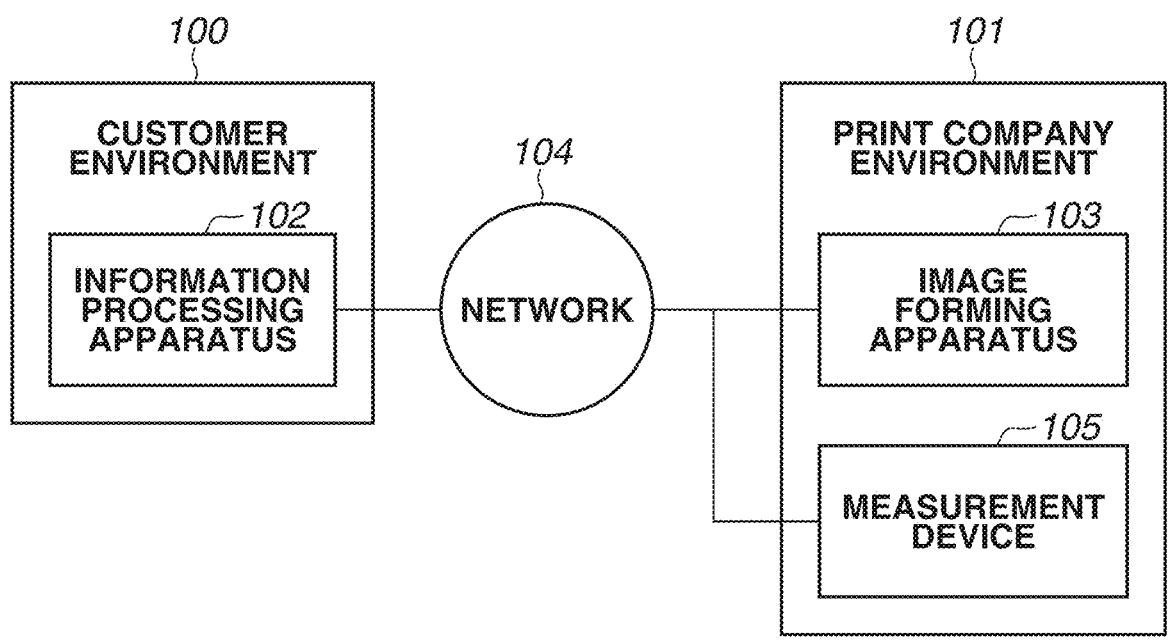
FIG. 1 is a system configuration diagram illustrating an information processing system according to a first embodiment.

FIG. 1 is a diagram illustrating an overall configuration of an information processing system according to a first embodiment. Environments of the entire information processing system in the following description are intended for easy understanding of description of the present invention, and the present invention is not limited to these environments.

FIG. 1 illustrates a customer environment 100 for placing an order for a print product, and a print company environment 101 that receives an order for a print product. An information processing apparatus 102, an image forming apparatus 103, and a measurement device 105 are connected to a network 104. In FIG. 1, the image forming apparatus 103 and the measurement device 105 are separately provided, but it is possible to perform measurement while performing printing, by providing an in-line sensor in the image forming apparatus 103.

Hypertext Transfer Protocol (HTTP) or HTTP Secure (HTTPS, specifically, HTTP over Transport Layer Security (TLS)) is used as a communication protocol for performing communication among the information processing apparatus 102, the image forming apparatus 103, and the measurement device 105. Communication via email or file exchange may be adopted as well.

A program for placing an order with a print company for a print product runs on the information processing apparatus 102. A customer makes a print quality requirement to the image forming apparatus 103 via the program. Specifically, the customer inputs a requirement about print quality of a print product, when placing an order for the print product. The program for placing an order with a print company may be a web application or may be a desktop client.

The image forming apparatus 103 receives print data and requirement data representing the print quality requirement, from the information processing apparatus 102. The image forming apparatus 103 analyzes the received print data, converts the analyzed print data into a dot image page by page, and prints the image. Further, in the image forming apparatus 103, the requirement data (the print quality requirement) is analyzed before or during print execution, and adjustment is performed to satisfy the print quality requirement. An operator who manages the image forming apparatus 103 may manually perform this adjustment, or an adjustment unit built into the image forming apparatus 103 may automatically perform this adjustment. After printing, the print product output from the image forming apparatus 103 is measured by using the measurement device 105, and whether the print quality requirement is satisfied is confirmed based on this measurement. The image forming apparatus 103 transmits this print quality result (measurement result) to the information processing apparatus 102.

FIG. 1 illustrates an example in which one information processing apparatus 102 and one image forming apparatus 103 are provided, but a plurality of these apparatuses may be provided. Further, the network 104 may be either the Internet or a local network. For example, in a case where these apparatuses are used only within a company, the entire network 104 can be configured of the local network.

Example of Hardware Configuration of Information Processing Apparatus 102

Figure 2:
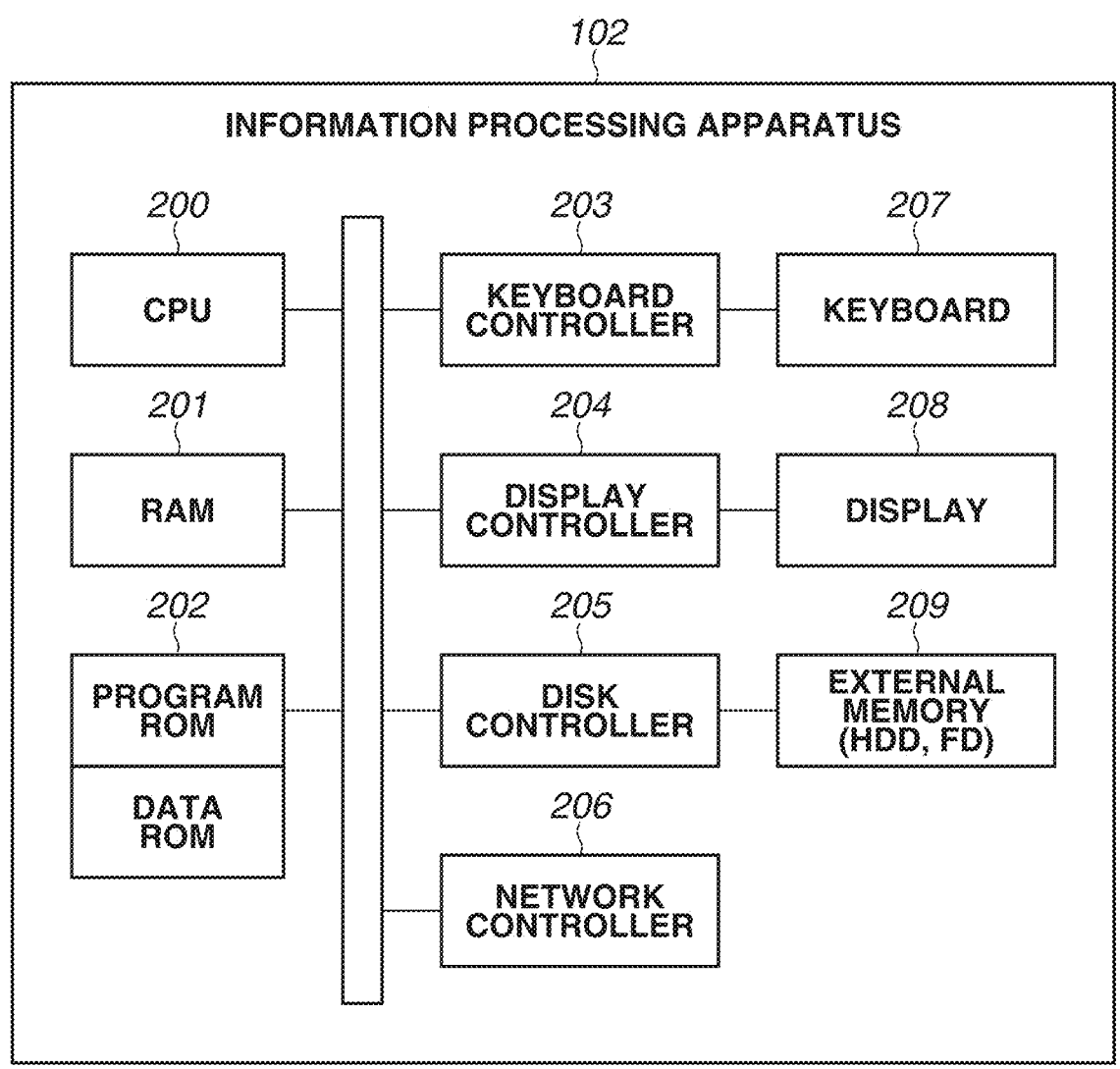
FIG. 2 is a block diagram illustrating a hardware configuration of an information processing apparatus according to the first embodiment.

FIG. 2 illustrates a hardware configuration of the information processing apparatus 102 of the present embodiment. The information processing apparatus 102 can be configured of hardware of an ordinary computer (a personal computer (PC)).

In FIG. 2, a central processing unit (CPU) 200 executes a program such as a program stored in a program read only memory (ROM) in a ROM 202, or an operating system (OS) or application program loaded from an external memory 209 into a random access memory (RAM) 201. In other words, the CPU 200 executes the program stored in a storage medium readable by the CPU 200, and thereby functions as each processing unit that executes processing of each flowchart to be described below.

The RAM 201 is a main memory of the CPU 200 and functions as a work area. A keyboard controller 203 controls inputs by operations from a keyboard 207, and from a barcode reader as well as pointing devices (such as a mouse, a touchpad, a touch panel, and a trackball) not illustrated. A display controller 204 controls display on a display 208. A disk controller 205 controls data access to the external memory 209 that stores various data, such as a hard disk drive (HDD) or flexible disk (FD). A network controller 206 is connected to the network 104 and executes communication control processing for communication with other devices connected to the network 104.

Example of Software Configuration of Information Processing Apparatus 102

Figure 3:
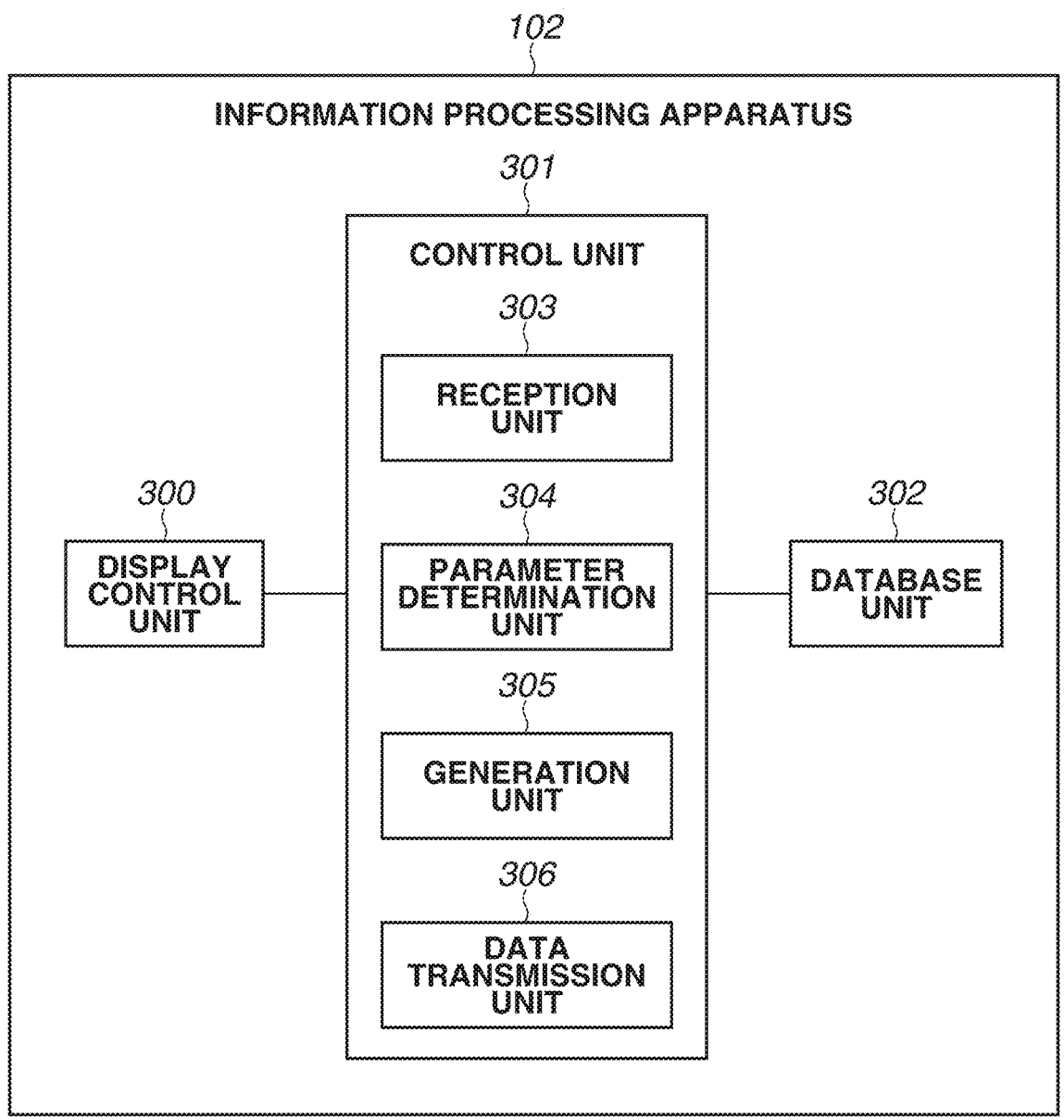
FIG. 3 is a block diagram illustrating a software configuration of the information processing apparatus according to the first embodiment.

FIG. 3 is a block diagram illustrating each function of the information processing apparatus 102 of the present embodiment.

The information processing apparatus 102 is roughly divided into a display control unit 300, a control unit 301, and a database unit 302.

The display control unit 300 displays an input screen for the customer (user), and passes an input value input by the customer on the input screen to the control unit 301. The input value in the present embodiment is a level of a print quality requirement concerning the overall print product.

The control unit 301 controls the overall program. The control unit 301 receives the input value from the display control unit 300, and stores (retains) data in the database unit 302, or acquires data from the database unit 302, as necessary. Any type of database unit may be employed as long as the database unit can store data. To process the print quality requirement, the control unit 301 has a reception unit 303, a parameter determination unit 304, a generation unit 305 that generates the requirement data about the print quality requirement, and a data transmission unit 306.

The reception unit 303 receives the input value (information about the print quality) from the display control unit 300.

The parameter determination unit 304 determines a range of a parameter about the print quality, based on the information about the print quality (the level of the print quality requirement concerning the overall print product). Examples of the parameter include color, barcode reading accuracy, print defect, and front and back registration accuracy.

The generation unit 305 generates the print quality requirement, based on the parameter determined by the parameter determination unit 304.

The data transmission unit 306 transmits the print quality requirement to the image forming apparatus 103.

The database unit 302 stores order data about the order of the customer. For example, the database unit 302 stores customer information, a contract amount, and a delivery date that are related to the order, as well as a print job and print data necessary for production of the print product. The database unit 302 also stores a table necessary for generation of the print quality requirement.

Data Flow

Figure 4:
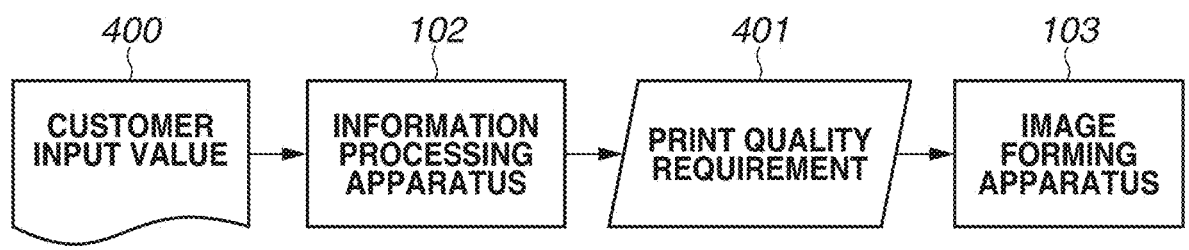
FIG. 4 is a block diagram illustrating a data flow according to the first embodiment.

FIG. 4 is an example of a diagram illustrating a data flow in the present embodiment. FIG. 4 illustrates a customer input value 400 (an overall quality level) input by the customer on the input screen. FIG. 4 further illustrates a print quality requirement 401 generated by the information processing apparatus 102. The print quality requirement 401 is transmitted to the image forming apparatus 103.

Example of Print Product

Figure 5:
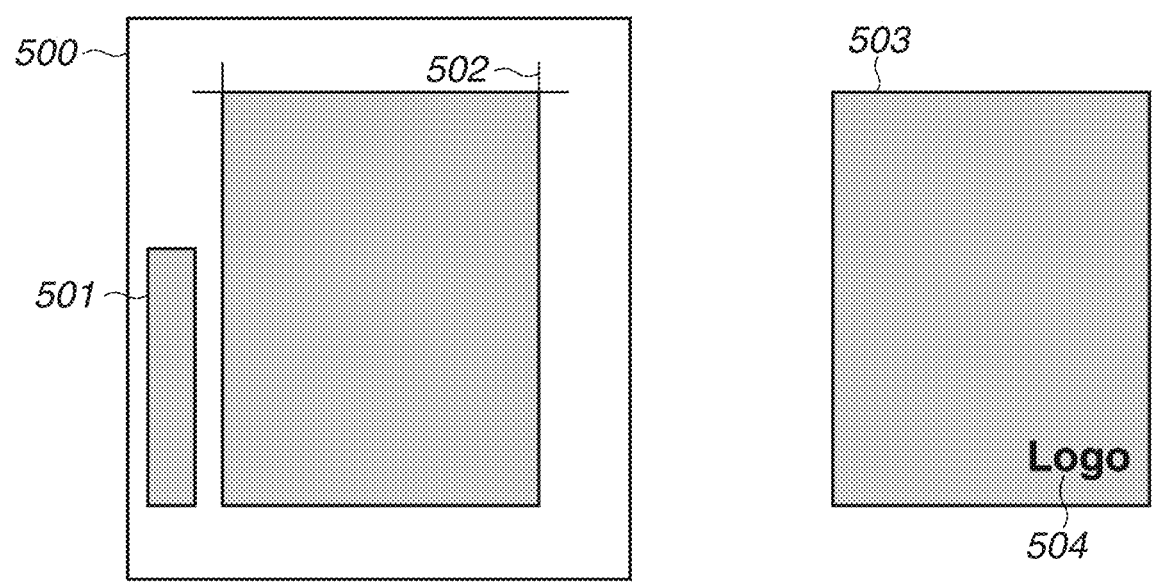
FIG. 5 is a schematic diagram illustrating an example of a print product according to the first embodiment.

FIG. 5 is a schematic diagram illustrating the print product in the present embodiment.

In FIG. 5, print products 500 and 503 each represent the print product output from the image forming apparatus 103. The print quality of the print product 500 or 503 is measured by the measurement device, and whether the print quality requirement from the customer is satisfied is confirmed based on this measurement.

A color patch 501 is provided in the print product 500. In general, for confirmation of color of an image printed on a sheet, a color patch printed on the margin of a print product is measured. Further, a cutting register mark 502 is provided. In the case of two-sided printing, front and back registration accuracy is calculated by measuring misregistration between a cutting register mark printed on the front side and that printed on the back side.

In the print product 503, an object 504 represents an object such as text, an image, or an illustration. For example, in a case where a print product with no margin such as a poster is created, the object 504 is directly measured by the measurement device 105, and whether the object 504 matches with the print quality requirement from the customer is determined based on this measurement.

In the present embodiment, a case where the print product in which a measurement position is determined beforehand as in the print product 500 will be described as an example.

Example of Input Screen for Print Quality Requirement

Figure 6:
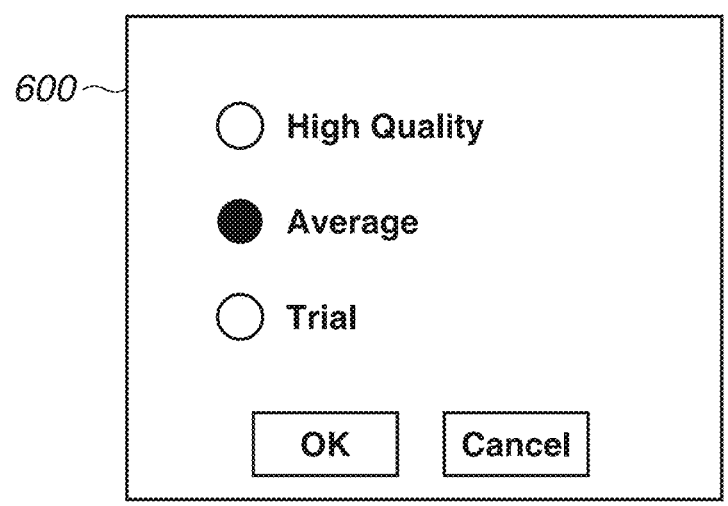
FIG. 6 illustrates an example of an input screen according to the first embodiment.

FIG. 6 illustrates an example of the input screen in the present embodiment.

An input screen 600 offers options for overall print quality of the print product to the customer. This screen can be implemented by using radio buttons for a screen layout, but is not limited to such. The input screen 600 offers three options of "High Quality", "Average", and "Trial", and the options can be modified as necessary. "High Quality", "Average", and "Trial" each represent the quality level of the overall print product, and in this example, one of three levels is to be designated.

Example of Conversion Table

FIG. 7 illustrates an example of a table that stores information for generating the print quality requirement 401 from the customer input value 400, in the first embodiment. The database unit 302 of the information processing apparatus 102 stores a table 700. The parameter determination unit 304 refers to the table 700 and acquires a parameter necessary for generation of the print quality requirement 401.

In the table 700, Grade corresponds to the quality level of the print product as a whole. Color, Barcode, Defect, and Registration each correspond to the parameter of the print quality, and are associated with each other. The table 700 indicates an acceptable range of each of the parameters of the print quality, for a deliverable. The table 700 stores information about Display Label, Rank, and Value Range as attributes, for each of the parameters of the print quality that are Color, Barcode, Defect, and Registration. Color indicates quality of color, Barcode indicates barcode reading accuracy, Defect indicates a defect acceptable range, and Registration indicates a misregistration acceptable range. The defect is a score calculated based on the size, frequency, and occurrence position of a hickey or rubbing line.

In the table 700, the Grade column includes values that each represent the level of the overall quality displayed on the input screen 600 to be designated. The Display Label attribute is the label of a value indicating each of the parameters of the print quality. The Rank attribute is a value for determining the ranking of the print quality. According to the PRX specifications of the ISO, the higher the value of the Rank attribute is (ranking ascends in order of, for example, 1, 2, and 3), the higher the ranking is. The Value Range attribute stores the range of a value indicating each of the parameters of the print quality.

Flowchart

FIG. 8 is a flowchart of processing for creation of the requirement data representing the print quality requirement in the present embodiment.

A program relating to each flow is stored in the ROM 202 or the external memory 209 of the information processing apparatus 102. The program is read out into the RAM 201, and then executed by the CPU 200. A program relating to a flow that will be described with reference to a flowchart is similar.

In step S801, the reception unit 303 receives the designated overall quality level of the print data of the request made by the customer (user) for printing by the image forming apparatus 103 via the screen. Specifically, the reception unit 303 acquires the value representing "Average" designated on the input screen 600.

In step S802, the parameter determination unit 304 determines the quality level (range) for each of the print parameters about the print quality, based on the information about the overall quality level received in step S801. Specifically, the parameter determination unit 304 refers to the table 700, and identifies a value for each of the parameters of the print quality corresponding to "Average", based on the value representing "Average" acquired in step S801. For example, as for the front and back registration accuracy, the value acquired in step S801 is "Average", and the parameter determination unit 304 performs processing as follows. The parameter determination unit 304 identifies the value of each of Display Label, Rank, and Value Range in a row corresponding to "Average" set in the Grade column, for each of Color, Barcode, Defect, and Registration.

The quality level for each of the parameters of the print quality determined in step S802 becomes "MinimumAcceptableRank" (the minimum requirement designated by the customer in the print quality requirement) in the PRX specifications. In step S803, the generation unit 305 generates the requirement data representing the print quality requirement, based on the quality level for each of the parameters determined by the parameter determination unit 304. There is a case where a value indicating quality higher than that of the value of the parameter corresponding to "MinimumAcceptableRank" identified in step S802 may be present. In this case, additional processing illustrated in FIG. 19 is performed in step S803.

In step S1900, the generation unit 305 confirms whether a value indicating quality higher than that of the value identified in step S802 is present. If the value indicating higher quality is present (YES in step S1900), the processing proceeds to step S1901. If the value indicating higher quality is not present (NO in step S1900), the processing ends. In step S1901, the generation unit 305 acquires the value indicating the quality higher than that of the identified value from the table 700, and generates the print quality requirement including the acquired value as the acquired value also satisfies the requirement of the user, thus indicating that either the identified value or the acquired value may be used.

In step S804, the data transmission unit 306 transmits the print data and the requirement data to the image forming apparatus 103.

As for the customer, the information processing system of the present embodiment can present the input screen on which the user can readily input the print quality requirement by performing the above-described steps. Besides, for the print company, it is possible to bring the print quality requirement from the customer into the range of each of the parameters such as the color, the barcode reading accuracy, and the front and back registration accuracy. This enables the print company to interpret the print quality requirement from the customer accurately and thus the print quality can be ensured reliably. This is effective for, in particular, a case where the number of the parameters of the print quality is large. In such a case, there is no need for the customer (user) to designate the print quality level for each of the parameters, and the user can convey the quality requirement only by designating the overall quality level. This utilizes, for example, the following tendency. A user who desires high quality tends to require high quality of a plurality of parameters for print quality, whereas a user who does not desire high quality tends to require not-so-high quality of a plurality of parameters for print quality.

Example of Requirement Data Representing Print Quality Requirement

FIG. 9 illustrates an example of the requirement data representing the print quality requirement 401 generated by the generation unit 305. In this example, only an example of the front and back registration accuracy is shown for convenience of description, but the parameters of the print quality such as the color, the barcode reading accuracy, and the print defect are also generated.

Data 900 represents the requirement data representing the print quality requirement 401. A portion 901 indicates a measurement target for the front and back registration accuracy. The portion 901 corresponds to the image of the cutting register mark 502 in FIG. 5. A measurement method is defined in a portion 902. According to the PRX specifications, the measurement method can be defined for each of the parameters of the print quality. For example, for the measurement of the color, a content different from the measurement method defined in the portion 902 will be described. Portions 903 and 904 correspond to the print quality requirement itself for the front and back registration accuracy, and are generated from the information stored in the table 700. Although a portion that matches with the print quality requirement designated by the customer is the portion 904, the portion 903 is also generated in the print quality requirement 401 because the portion 903 represents quality higher than that of the print quality requirement designated by the customer. Therefore, the print company may use either the portion 903 or 904, when producing the print product. This is because both of the portions 903 and 904 satisfy the requirement of the customer. A portion 905 specifies a measurement position of the measurement target 901. In this example, according to the portion 905, the measurement target specified in the portion 901 is present at a position moved from BL (Bottom Left) of the origin in an XY axis (11 mm, 5 mm).

Flowchart of Device Adjustment in Image Forming Apparatus 103

Figure 20:
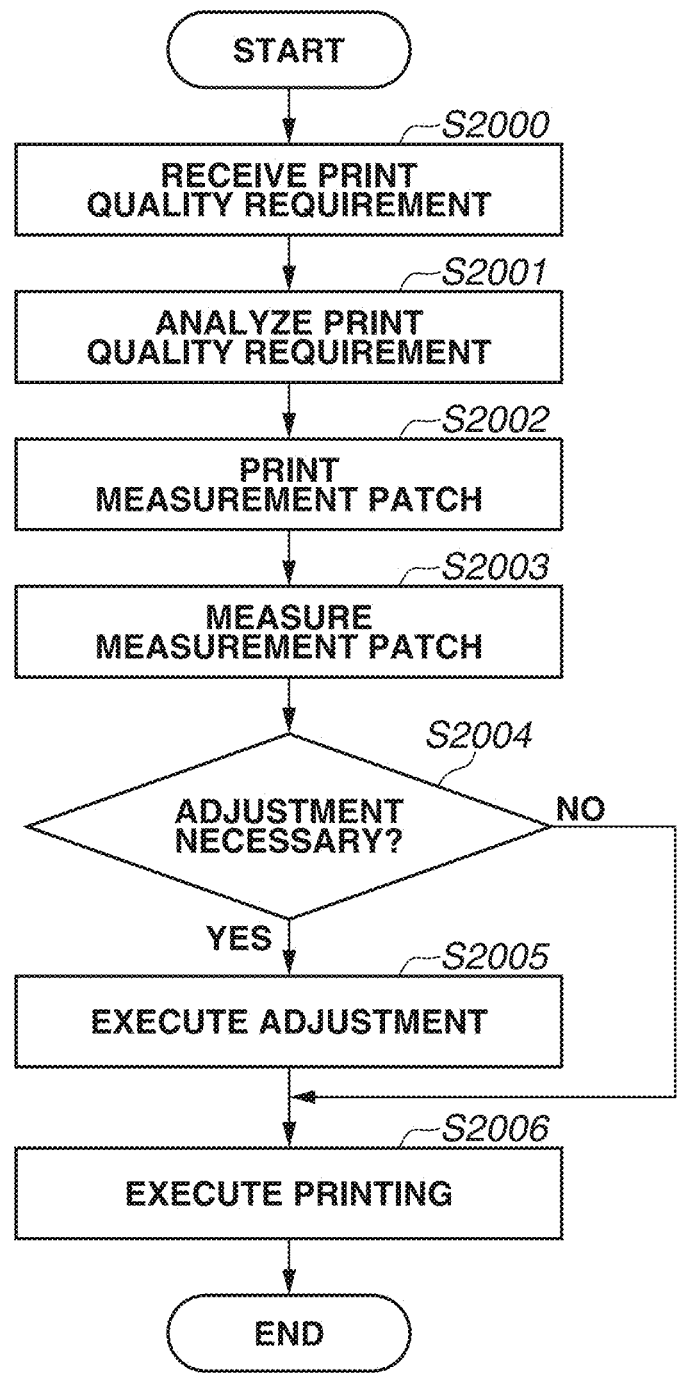
FIG. 20 illustrates an adjustment flowchart of an image forming apparatus according to the first embodiment.

FIG. 20 is a flowchart of device adjustment processing in the present embodiment. In the image forming apparatus 103, the print quality requirement is analyzed before or during the print execution, so that the adjustment is performed to satisfy the print quality requirement. The operator who manages the image forming apparatus 103 may manually perform this adjustment, or the adjustment unit built into the image forming apparatus 103 may automatically perform this adjustment. In step S2000, a reception unit 2400 (see FIG. 24) receives the requirement data representing the print quality requirement. In step S2001, the reception unit 2400 analyzes the print quality requirement and thereby acquires the parameters such as the color, the barcode reading accuracy, and the front and back registration accuracy from the print quality requirement. In step S2002, a control unit 2401 (see FIG. 24) prints a measurement patch prepared beforehand.

In step S2003, the measurement device 105 measures the measurement patch, with reference to each of the parameters of the print quality requirement. In the present embodiment, the measurement device 105 is configured to be separate from the image forming apparatus 103. However, the image forming apparatus 103 may be provided with an in-line sensor, and the measurement patch may be measured within the image forming apparatus 103 by using the in-line sensor. In step S2004, the measurement device 105 determines whether the adjustment of the image forming apparatus 103 is necessary, based on a measurement result of the measurement in step S2003. If the adjustment is necessary (YES in step S2004), the processing proceeds to step S2005. If the adjustment is not necessary (NO in step S2004), the processing proceeds to step S2006. In step S2005, a device adjustment unit 2402 (see FIG. 24) executes the adjustment of the image forming apparatus 103. Specifically, the device adjustment unit 2402 performs the adjustment such as adjustment of the color and adjustment of the front and back registration accuracy, based on the input from the user. In the present embodiment, the user views the measurement result of the measurement device 105 and determines an adjustment value based on the measurement result. In the case where the image forming apparatus 103 includes the in-line sensor, the print product is measured during printing, and thus the adjustment value can be automatically determined from the measurement result. In step S2006, a print execution unit 2403 (see FIG. 24) executes printing.

Flowchart of Measurement of Print Product in Measurement Device 105

Figure 21:
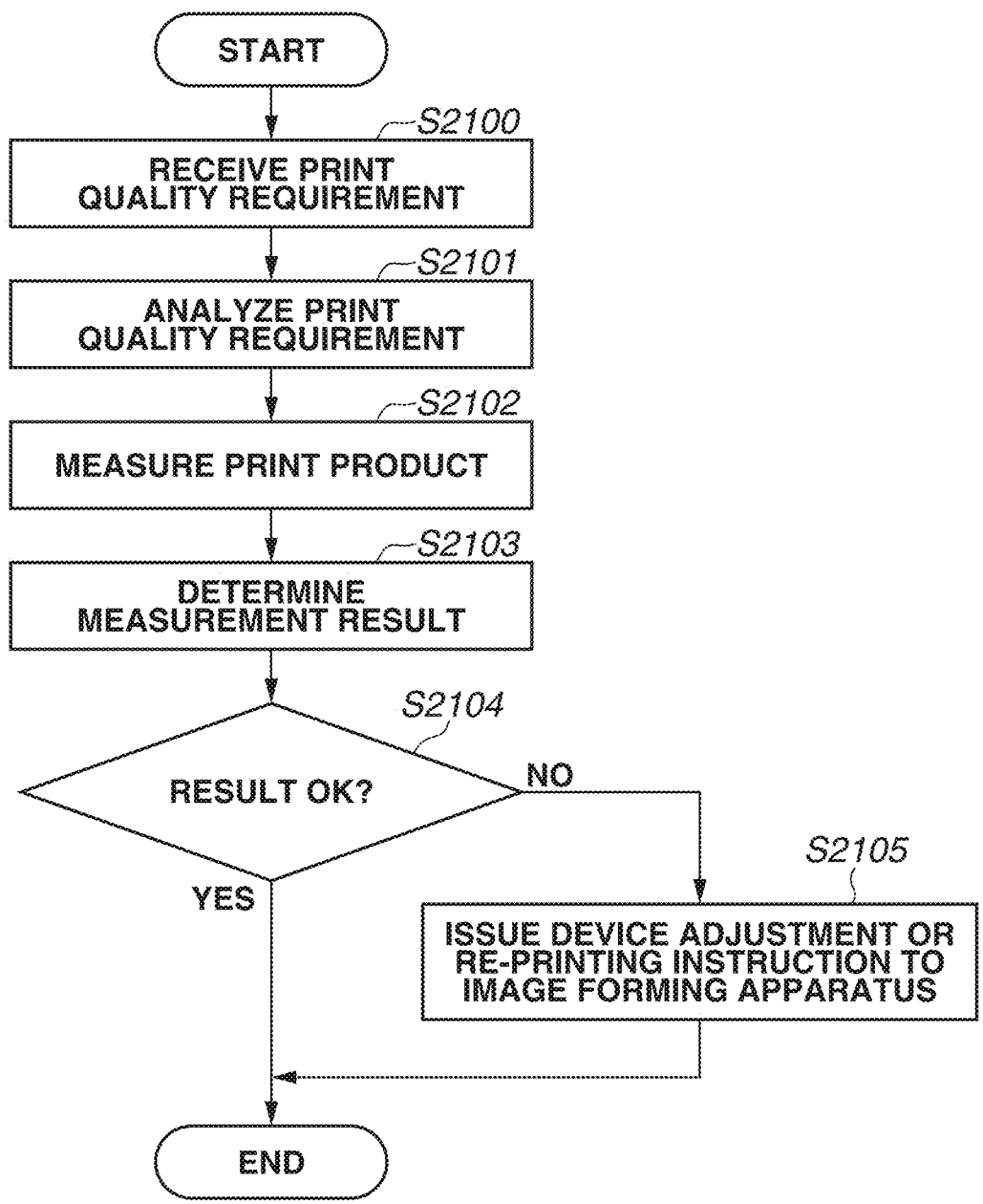
FIG. 21 illustrates a measurement flowchart of a measurement device according to the first embodiment.

FIG. 21 is a flowchart of measurement processing in the present embodiment. After printing, the print product output from the image forming apparatus 103 is measured by using the measurement device 105, and whether the print quality requirement is satisfied is confirmed based on this measurement. The print quality requirement can be utilized for, for example, giving an instruction for device adjustment and an instruction for re-printing. In step S2100, a reception unit 2500 (see FIG. 25) receives the print quality requirement. In step S2101, the reception unit 2500 analyzes the print quality requirement and thereby acquires the parameters such as the color, the barcode reading accuracy, and the front and back registration accuracy from the print quality requirement. In step S2102, a measurement unit 2501 (see FIG. 25) measures the print product output from the image forming apparatus 103. In step S2103, the measurement unit 2501 determines a measurement result, based on the parameters of the print quality requirement. In step S2104, the measurement unit 2501 determines whether the measurement result is OK, i.e., whether the measurement result falls within the range of each of the parameters designated in the print quality requirement. If the measurement result is OK (YES in step S2104), this flowchart ends. If the measurement result is not OK (NO in step S2104), the processing proceeds to step S2105. In step S2105, the measurement unit 2501 issues an instruction to the image forming apparatus 103. Specifically, the measurement unit 2501 issues an instruction for the device adjustment in a case of measuring the measurement patch. Alternatively, the measurement unit 2501 issues an instruction for re-printing in a case where the print product is measured. The instruction for the adjustment or re-printing and a job can be associated with each other by using a value of "PrinterJobNumber" in a portion 2302 illustrated in FIG. 23.

Flowchart of Reporting Measurement Result in Measurement Device 105

Figure 22:
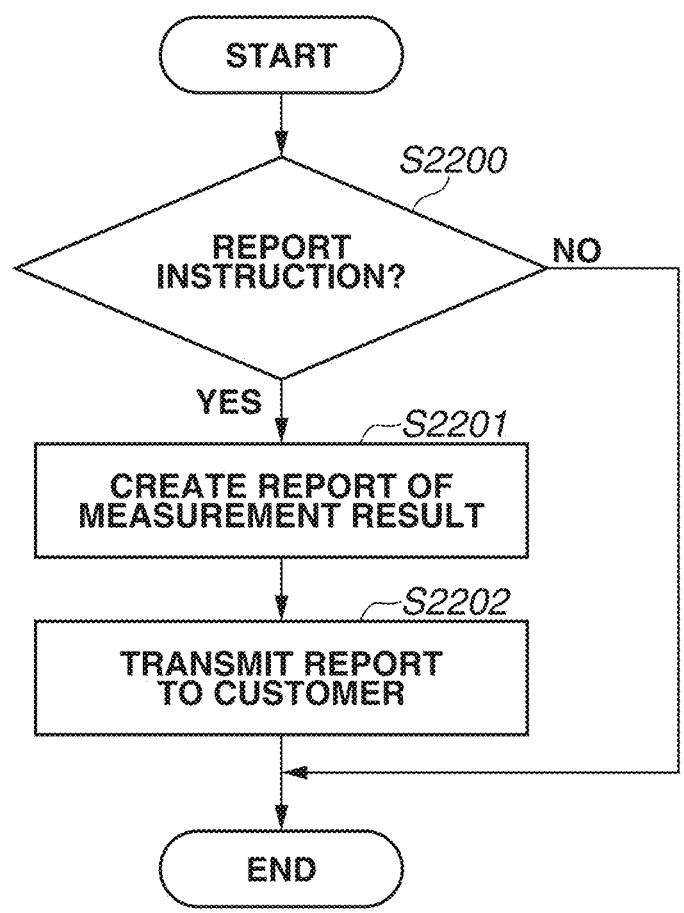
FIG. 22 illustrates a report flowchart of the measurement device according to the first embodiment.

FIG. 22 is a flowchart of reporting measurement result in the present embodiment. The print quality requirement can also be utilized for, for example, reporting the measurement result to the customer, in addition to giving the instruction for device adjustment and the instruction for re-printing. In step S2200, a report unit 2502 (see FIG. 25) determines whether a report instruction from the user is received. If the report instruction is received (YES in step S2200), the operation proceeds to step S2201.

In step S2201, the report unit 2502 acquires the measurement result and creates a report of the acquired measurement result. In step S2202, the report unit 2502 transmits the report to the customer.

Example of Report Data Created in Measurement Device 105

FIG. 23 illustrates an example of the report (report data) created by the measurement device 105. Print Quality eXchange (PQX) developed by the ISO is used for the data format. Besides PQX, the CusQC and MisQC Interoperability Conformance Specifications developed by the CIP4, a standards group for commercial printing, may be used. Further, Color Exchange Format (CXF) developed by the ISO is used as the data format of color measurement information of color. Data 2300 is an example of the report to be transmitted to the customer. A portion 2301 describes information about the print company environment 101 of the print company that receives the order for the print product. A portion 2302 describes information about the image forming apparatus 103 that has output the print product and the job of the print product. A portion 2303 describes the measurement result. A portion 2304 indicates the measurement result regarding the color. A portion 2305 indicates the measurement result of the front and back registration accuracy. A portion 2306 indicates the measurement result of the barcode reading accuracy. A portion 2307 indicates the color measurement information about the measurement result regarding the color.

Software Configuration Example of Image Forming Apparatus 103

Figure 24:
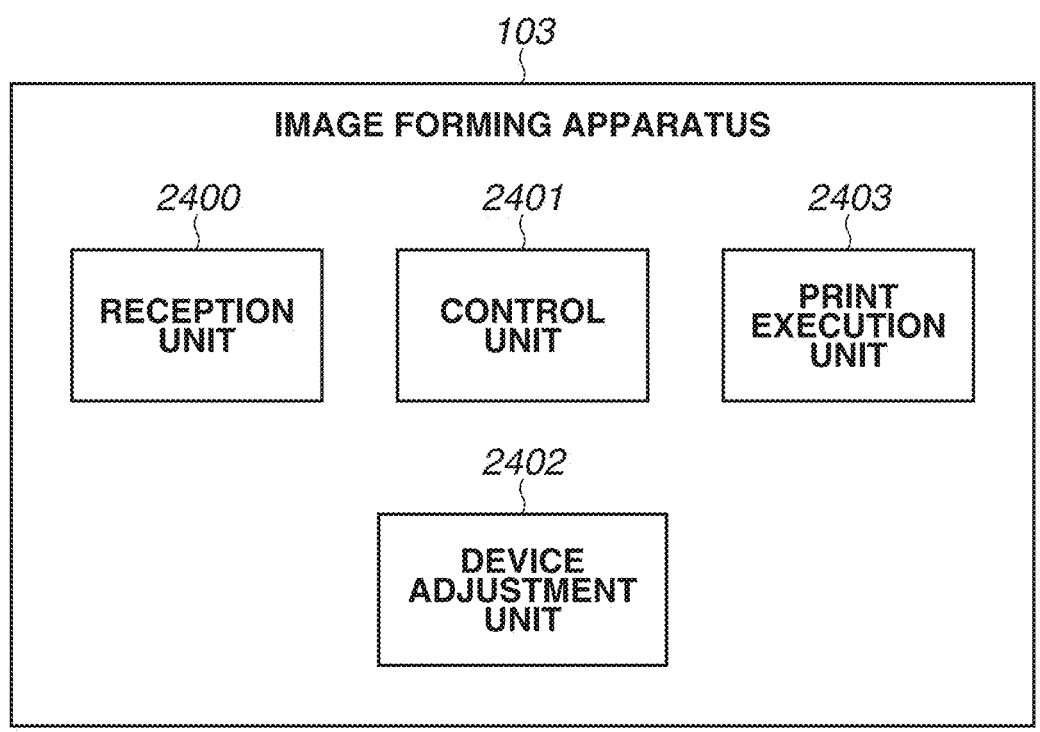
FIG. 24 is a block diagram illustrating a software configuration of the image forming apparatus according to the first embodiment.

FIG. 24 is a block diagram illustrating each function of the image forming apparatus 103 of the present embodiment. The reception unit 2400 receives the print quality requirement and the print job.

The control unit 2401 controls print processing. Further, the control unit 2401 issues an instruction for generation of the measurement patch and an instruction for printing of the measurement patch. The control unit 2401 also issues an instruction for printing of the print job. Furthermore, upon receiving an instruction from the measurement device 105, the control unit 2401 instructs the device adjustment unit 2402 to execute the device adjustment, or instructs the print execution unit 2403 to perform the re-printing. The device adjustment unit 2402 performs the adjustment of the image forming apparatus 103. The print execution unit 2403 executes printing in the image forming apparatus 103.

Software Configuration Example of Measurement Device 105

Figure 25:
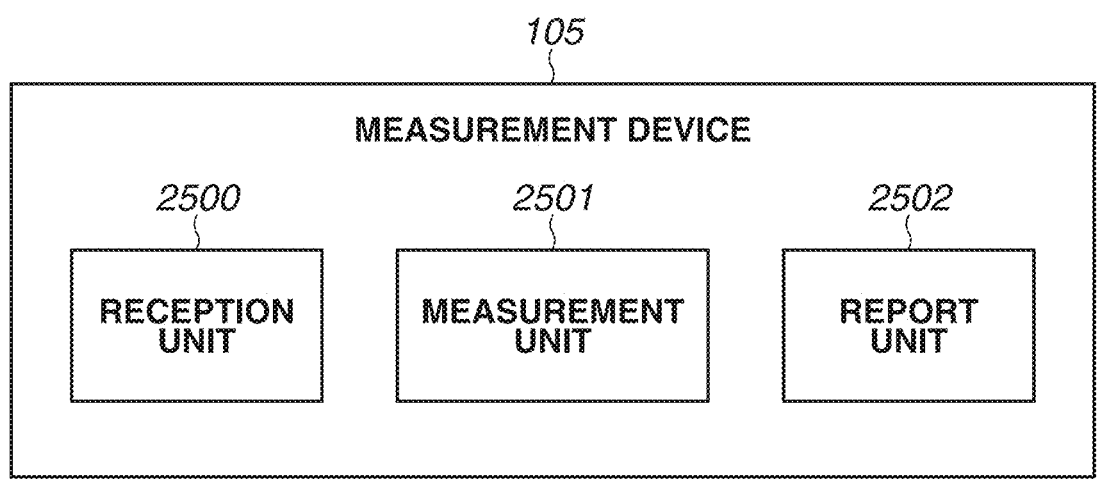
FIG. 25 is a block diagram illustrating a software configuration of the measurement device according to the first embodiment.

FIG. 25 is a block diagram illustrating each function of the measurement device 105 of the present embodiment. The reception unit 2500 receives the print quality requirement. The measurement unit 2501 measures the print product output from the image forming apparatus 103 based on the print quality requirement, and issues the instruction for the adjustment or re-printing to the image forming apparatus 103 based on the measurement result. The report unit 2502 creates the report based on the measurement result, and transmits the report to the customer designated as a transmission destination.

According to the present embodiment described above, the range of the print quality requirement can be determined based on the screen operation by the customer. Therefore, the customer can easily designate the range of each of the parameters of the print quality. In addition, the print company can accurately grasp to what degree the customer can accept the misregistration of the print quality.

Three modifications of the first embodiment will be described below.

In a first modification, there will be described such a form that the customer explicitly inputs a minimum requirement or an expected value of the print quality requirement into the input screen, and a range of the print quality is determined based on this input.

Figure 12:
FIG. 12 illustrates an example of an input screen according to a first modification of the first embodiment.

FIG. 12 illustrates an example of the input screen for the print quality requirement in the first modification. An input screen 1200 offers options for the overall print quality of the print product to the customer. This screen can be implemented by using radio buttons for a screen layout. The input screen 1200 offers two options of "Desired Rank" (the expected value) and "Minimum Acceptable Rank" (the minimum requirement). The wording of the options in the present modification are examples and are not intended to limit the present invention.

An agreement between the customer and the print company in terms of the expected value and the minimum requirement can be reached beforehand, in a form of so-called repeat order of placing an order for the same print product as that of the last order. Accordingly, the print quality requirement of the customer can be conveyed to the print company by enabling the customer to input either of the two options as in the present modification. In addition, in a case of business incapable of exchanging information about print quality with an unspecified number of customers such as print mail order, for example, a "user's guide for placing an order" is prepared. Further, explanation about what level of print quality can be obtained if the customer selects each of Desired Rank and Minimum Acceptable Rank is prepared. Further, explanation may be displayed on the input screen 1200 as a user's manual for placing an order, instead of being separately provided.

FIG. 13 illustrates an example of a table that stores information for generating the print quality requirement in the first modification. A table 1300 is different from the table 700 in that the table 1300 includes Desired Rank and Minimum Acceptable Rank. Desired Rank represents the expected value of the customer, and Minimum Acceptable Rank represents the minimum requirement that satisfies the print quality requirement of the customer. The table is an example and any form may be adopted as long as Desired Rank and Minimum Acceptable Rank can be distinguished for each of the parameters for print processing. The customer and the print company determine the expected value and the minimum requirement beforehand. Alternatively, in the case of the print mail order, as described above, the "user's guide for placing an order" is prepared, and the explanation about what level of print quality can be obtained if the customer selects each of Desired Rank and Minimum Acceptable Rank is provided.

In the table 1300, the expected value and the minimum requirement can be defined for each of the parameters of the print quality such as the color, the barcode reading accuracy, the print defect, and the front and back registration accuracy. In a case where Desired Rank is designated on the input screen 1200, value groups 1301, 1302, 1303, and 1304 are identified. In a case where Minimum Acceptable Rank is designated, value groups 1305, 1306, 1307, and 1308 are identified.

The creation of the requirement data representing the print quality requirement is basically similar to that described with reference to FIG. 8, but the additional processing in step S803 is a flowchart illustrated in FIG. 15, not the flowchart in FIG. 19.

There is a case where the parameter corresponding to DesiredRank identified in step S802 ranks at the bottom (a case where the value of the Rank attribute is the lowest). For example, in the case of FIG. 16, DesiredRank (a value indicating Rank) of Defect ranks at the bottom in a value group 1600. In this case, in step S803, the additional processing in FIG. 15 is executed.

In step S1500, the generation unit 305 determines whether a parameter designated as DesiredRank ranks at the bottom. If the parameter ranks at the bottom (YES in step S1500), the processing proceeds to step S1501. If the parameter does not rank at the bottom (NO in step S1500), the processing proceeds to step S1502.

In step S1501, the generation unit 305 makes DesiredRank (a portion 1400 in FIG. 14) and MinimumAcceptableRank (a portion 1401 in FIG. 14) have the same value.

In step S1502, the generation unit 305 makes MinimumAcceptableRank (the portion 1401) have the value of Rank immediately below that of the parameter designated as DesiredRank.

In the case of the value group 1600 in FIG. 16, DesiredRank (the portion 1400) and MinimumAcceptableRank (the portion 1401) are made to have the same value. Meanwhile, in a case where DesiredRank does not rank at the bottom as in a value group 1601 in FIG. 16, the following is performed. The generation unit 305 makes MinimumAcceptableRank (the portion 1401) have the value of Rank (corresponding 0.003 mm or less in a value group 1602) immediately below that of the parameter designated as DesiredRank.

FIG. 14 illustrates an example of the print quality requirement created by the customer in the first modification. The portion 1400 represents the expected value of the print quality requirement of the customer. The portion 1401 represents the minimum requirement of the print quality requirement of the customer. Portions 1402 and 1403 represent the print quality requirement of the customer.

In the first embodiment, there is described the example in which the options about the print quality are displayed on the input screen and the customer easily inputs the print quality requirement. As a second modification, a form in which the customer explicitly inputs the range of the print quality requirement in the input screen will be described.

FIG. 17 illustrates an example of the input screen for the print quality requirement in the second modification. An input screen 1700 offers options for the overall print quality of the print product to the customer. This screen can be implemented by using a slide bar for a screen layout. The input screen 1700 offers the form of the slide bar that enables the customer to designate the print quality requirement for the front and back registration accuracy, in a range of "High Quality", "Average", and "Trial". The customer can determine the value of the minimum requirement, by horizontally moving an end 1701 of the slide bar. Further, the customer can determine the value of the expected value, by horizontally moving another end 1702. In the present modification, the input screen that enables the customer to designate the print quality requirement for the front and back registration accuracy is described, but the input screen in the present modification can also be implemented for other parameters such as the color and the barcode reading accuracy. In the present modification, the slide bar has two pointers, but more than two pointers may be prepared to create a parameter other than the expected value and the minimum requirement.

FIG. 18 illustrates an example of the requirement data representing the print quality requirement generated by the generation unit 305 in the second modification. A portion 1800 is the expected value of the print quality requirement input in the input screen 1700. A portion 1801 is the minimum requirement of the print quality requirement input in the input screen 1700. A portion 1802 represents the parameter of the expected value of the print quality requirement input in the input screen 1700. A portion 1803 represents the parameter of the minimum requirement of the print quality requirement input in the input screen 1700.

In the first embodiment, there is described the example in which the options for the print quality are displayed on the input screen as employed in a conventional printer driver, and the customer easily inputs the print quality requirement. In this example, the measurement target is determined beforehand, but there is a case where the position of the measurement target is free as in the print product 503 (e.g., a poster) in FIG. 5. In a third modification of the first embodiment, a form of a case where a measurement target and a measurement position can be designated on the input screen will be described.

Figure 10:
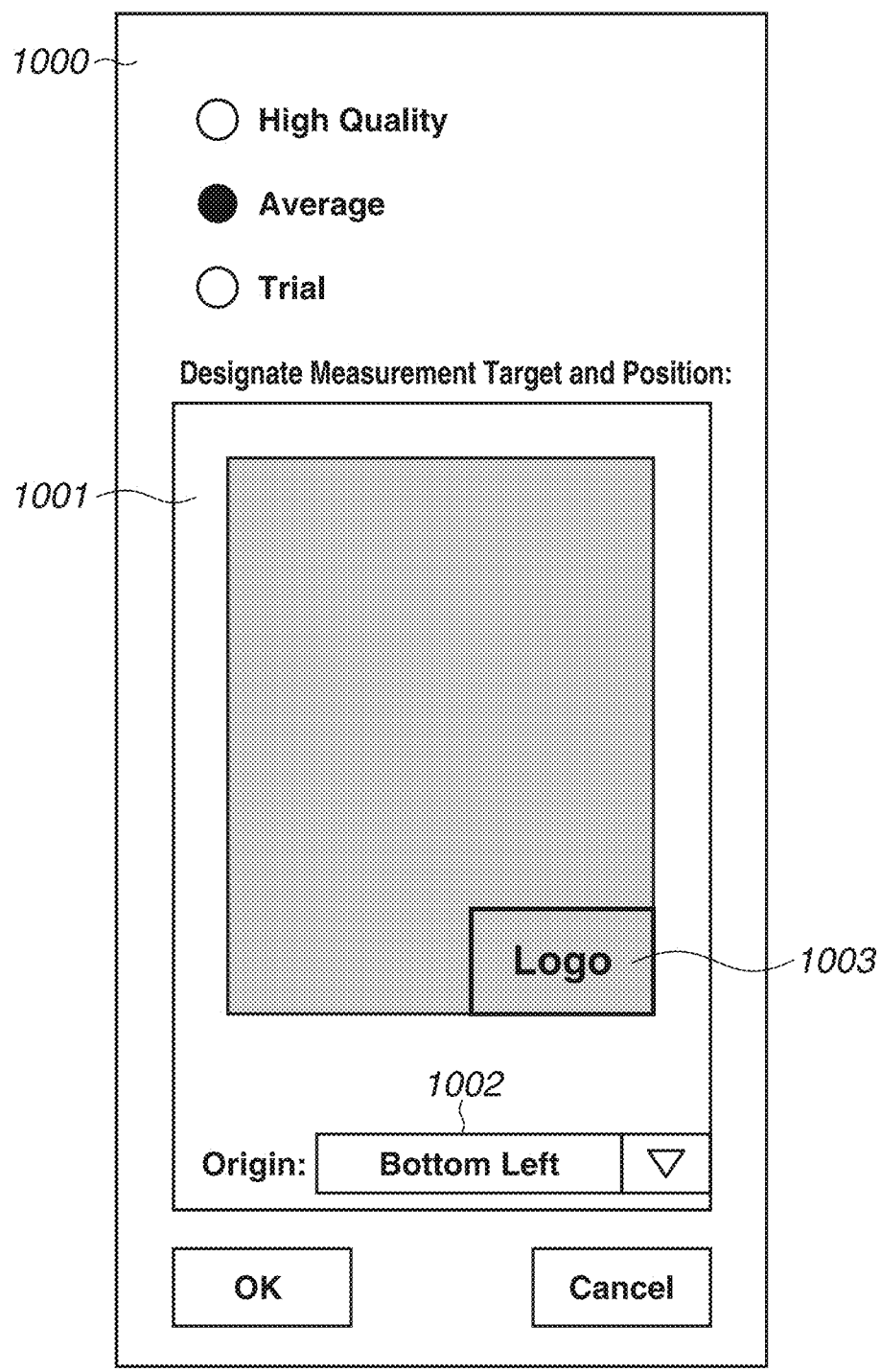
FIG. 10 illustrates an example of an input screen according to a third modification of the first embodiment.

FIG. 10 illustrates an example of the input screen for the print quality requirement in the third modification. In an input screen 1000, the measurement target and the measurement position can be designated in an area 1001. In the area 1001, a preview of the print product is displayed. In an area 1002, an origin for calculating the measurement position is designated. A rectangle 1003 is used to graphically designate the measurement target and the measurement position. The X-axis of the measurement position is determined by laterally moving the rectangle 1003, and the Y-axis of the measurement position is determined by vertically moving the rectangle 1003. An object within the rectangle 1003 is treated as the measurement target. The rectangle 1003 can expand and contract vertically and laterally, as well as diagonally at an angle of 45 degrees.

FIG. 11 illustrates an example of the requirement data representing the print quality requirement in the third modification. The measurement target determined in FIG. 10 is stored in a portion 1100.

In a portion 1101, the measurement position determined in the input screen in FIG. 10 is stored.

According to the above-described embodiment, it is possible to easily set the print quality requirement that reflects various facts such as a print intention, in printing a certain document. Specifically, there is a case where the print quality varies due to various factors in production of the print product and it is necessary for the customer to designate some range for the print quality (an acceptable range for the print quality). For example, in a case where a plurality of image forming apparatuses (of the same model) is operated in parallel, the apparatuses can vary in terms of color tone and accuracy. Further, an automatic trimmer is used for many products, and thus minute cutting misregistration can occur within the same lot in placement of the same order. According to the above-described embodiment, the print company (the image forming apparatus) can grasp to what extent changes such as color variations, accuracy variations, and cutting misregistration are acceptable to the customer (user).

According to the above-described embodiment, it is possible to reduce a burden placed on a user to generate requirement data representing a quality level for each of print parameters.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2019-048236, filed Mar. 15, 2019, which is hereby incorporated by reference herein in its entirety.

What is claimed is:

1. An information processing apparatus comprising:
   a reception unit configured to receive designation of a level of a print quality requirement concerning a print product;
   a storage unit configured to store a table in which the level of a print quality requirement is associated with information indicating an acceptable range for each of a plurality of print quality items;
   an identification unit configured to identify the information indicating the acceptable range for each of the plurality of print quality items corresponding to the received level of the print quality requirement concerning the print product, based on the table; and
   a transmission unit configured to transmit print data and quality requirement data about the print data, the quality requirement data including the identified information indicating the acceptable range for each of the plurality of print quality items.

2. The information processing apparatus according to claim 1, wherein the quality requirement data is data representing a quality requirement for the print product to be obtained by printing of print data.

3. The information processing apparatus according to claim 1, further comprising a display control unit configured to display a screen for receiving the designation of a level of a print quality requirement concerning the print product.

4. A method for controlling an information processing apparatus, the method comprising:
   receiving designation of a level of a print quality requirement concerning a print product;
   storing a table in which the level of a print quality requirement is associated with information indicating an acceptable range for each of a plurality of print quality items;
   identifying the information indicating the acceptable range for each of the plurality of print quality items corresponding to the received level of the print quality requirement concerning the print product, based on the table; and transmitting print data and quality requirement data about the print data, the quality requirement data including the identified information indicating the acceptable range for each of the plurality of print quality items.

5. The method for controlling an information processing apparatus according to claim 4, wherein the quality requirement data is data representing a quality requirement for the print product to be obtained by printing of print data.

6. The method for controlling an information processing apparatus according to claim 4, further comprising controlling display on a screen for receiving designation of a level of a print quality requirement concerning the print product.

7. A non-transitory computer readable medium that stores a program comprising instructions, which when executed by one or more processors, cause an information processing apparatus to:

receive designation of a level of a print quality requirement concerning a print product;

store a table in which the level of a print quality requirement is associated with information indicating an acceptable range for each of a plurality of print quality items;

identify the information indicating the acceptable range for each of the plurality of print quality items corresponding to the received level of the print quality requirement concerning the print product, based on the table; and transmit print data and quality requirement data about the print data, the quality requirement data including the identified information indicating the acceptable range for each of the plurality of print quality items.

8. The non-transitory computer readable medium according to claim 7, wherein the quality requirement data is data representing a quality requirement for the print product to be obtained by printing of print data.

9. The non-transitory computer readable medium according to claim 7, wherein the instructions, when executed by the one or more processors, further cause the information processing apparatus to display a screen for receiving designation of a level of a print quality requirement concerning the print product.

* * * * *